Patented June 24, 1930

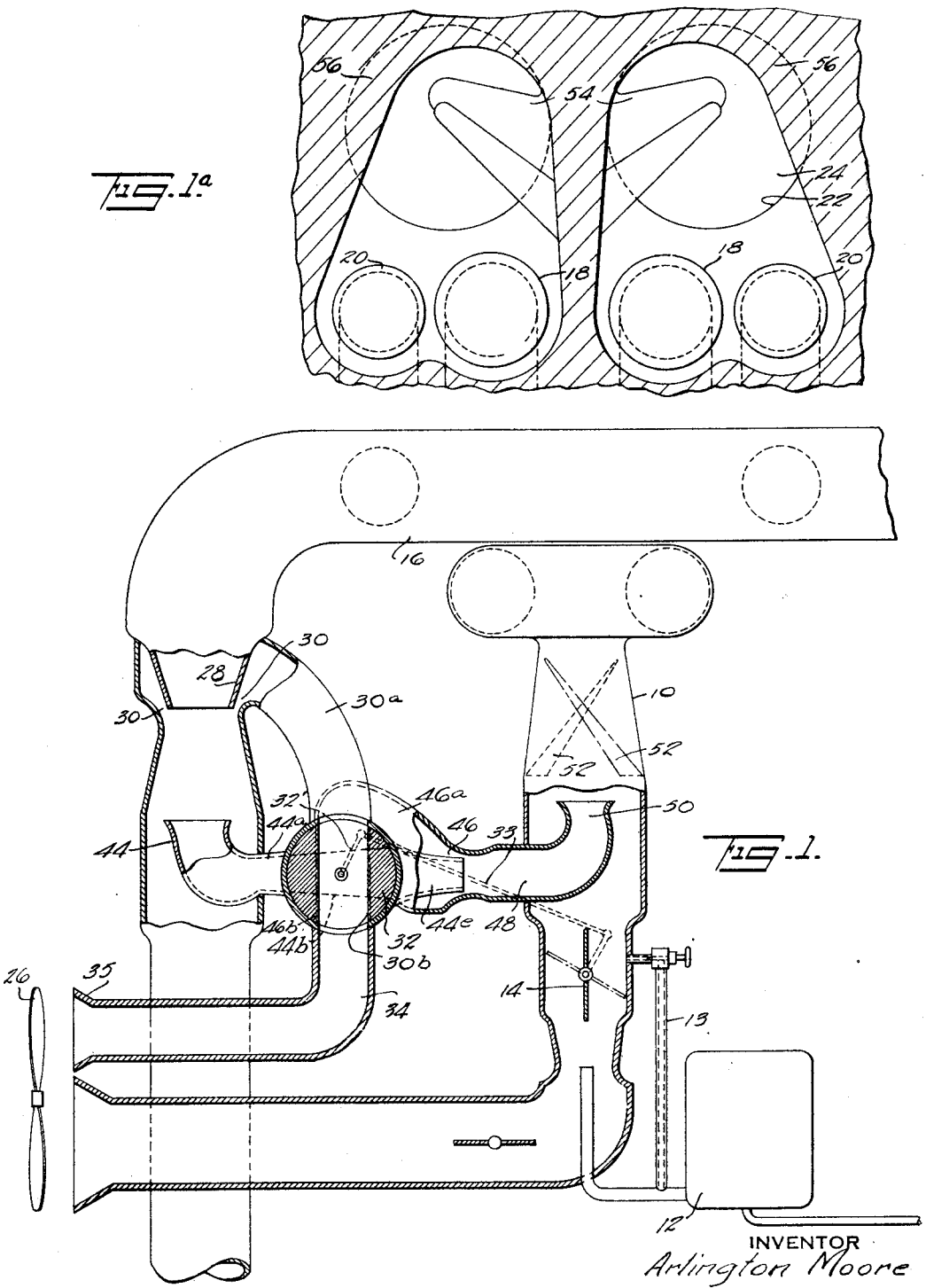

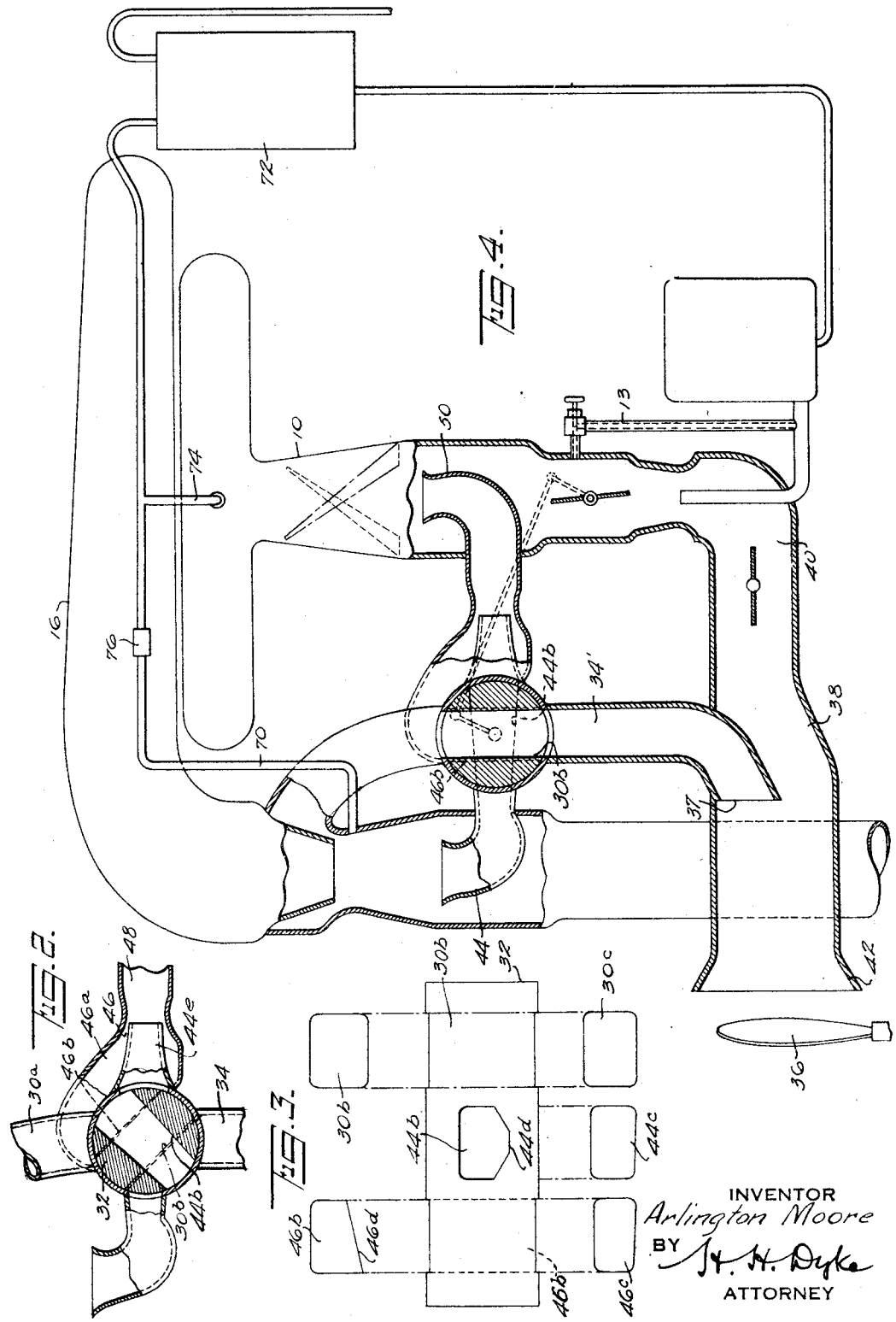

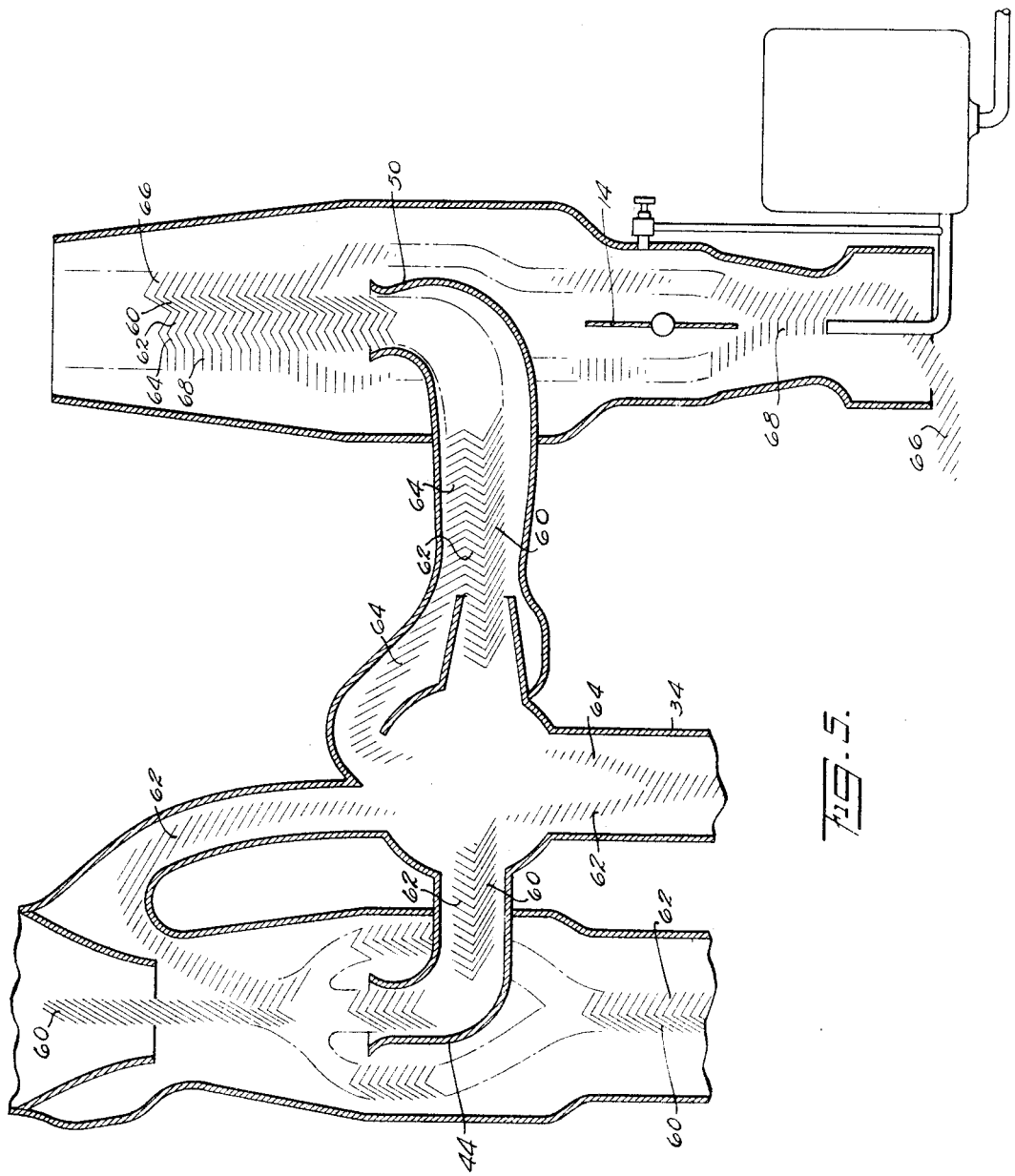

1,766,675

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

PROCESS OF EXHAUST GAS AERATION AND CHARGE PREPARATION FOR INTERNAL-COMBUSTION ENGINES

Application filed February 12, 1927. Serial No. 167,830.

My invention is of a process of exhaust gas aeration and charge preparation for combustion in internal combustion engines, and is particularly applicable to four-cycle engines, such as automobile, truck and airplane engines, using light liquid fuel, of which so-called gasoline is a typical present-day example. My process if preferably performed by apparatus which is inbuilt in constructing the engine, but may be carried out with apparatus installed as accessory equipment.

Object

The principal object of my invention is the provision of a process which is an advance over that disclosed in my application Serial No. 154,345, filed December 13, 1926, for process of preparing charges for combustion in internal combustion engines, in that air is admixed with the exhaust gas stream before part thereof is diverted for bypassing to the engine intake, and also in that heat transfer between exhaust gas and air is performed substantially entirely by direct admixture of these gases, and resort to use of heaters and coolers for indirect heat exchange and radiation is avoided.

The object of the invention further consists in the provision of a simplified process whereby the power characteristics of the Otto cycle are beneficially modified to increase the ratio of mean effective pressure to maximum pressure, with resultant increase of thermal efficiency and betterment of engine performance in power and smoothness, whereby detonation and preignition are avoided with use of gasoline or other substantially equivalent liquid fuel which need not contain anti-detonation substances, and this even in engines with compression ratio of around 6.:1 or higher, thus making such engines available for practical use; a gain in fuel economy is secured; crankcase dilution is substantially eliminated; and practically complete combustion secured with freedom from carbon deposits and substantially complete elimination of carbon monoxide from the engine exhaust.

General statement

With the foregoing and related objects in view, my improved process may be described in general terms as comprising the admixture of air with the entire exhaust gas stream of an internal combustion engine, diverting a part of such mixture from the exhaust gas conduit, and preparing charge material for combustion in the engine cylinders by delivery of such diverted mixture of exhaust gas and air, with preferably still further air admixed therewith, above the engine throttle into direct admixture with the fuel and air stream from the carburetor, the air for aerating the exhaust gas stream, the diverted portion of the aerated exhaust gas and the air added to such diverted portion of the aerated exhaust gas being supplied in proportions and quantities automatically metered and at temperatures and pressures automatically regulated adjunctively to engine throttling throughout the range of engine operation.

By another part of my process, which may be dispensed with, especially when my process is carried out with accessory equipment on old engines, but is preferably included, I put the gases entering the cylinder on the intake stroke into a state of violent agitation and admixture with the unscavenged gases of the prior cycle, and violently agitate the confined gases on the compression stroke so that, when the charge is ignited towards the end of the compression stroke, the gaseous components are thoroughly admixed together and the entire charge is in a state of violent agitation adapted, upon ignition, to spread the flame rapidly throughout all parts of the combustion chamber.

Formation of fuel and air stream

Available commercial carburetors can be used for mixing volatile liquid fuel with an air stream, or the carburetor may be constructed with its metering characteristics especially adapted for use with the other steps of my process. In the carburetor the fuel in subdivided or atomized state is ada single, multiported rotary metering valve interlinked with the throttle.

Ignition timing

With the use of the inert exhaust gas in the charge material, I am enabled to extend the period of combustion and increase mean effective pressure by advancing the time of ignition for general running to around 30 to 40 degrees ahead of top center, without causing detonation or preignition.

Agitation in the engine cylinder

In addition to the forming of charge material as described prior to the charges entering the engine cylinder, I preferably make provision for producing substantially the maximum possible agitation of the gases at all times from the entry of the gases past the intake valve up to the time of their combustion. This may be accomplished in various ways, one way being to provide substantially turbine or vane-like members in the combustion chambers arranged at an angle to set the gases whirling in cyclonic movement in one direction as the piston moves down on the intake stroke and in the opposite direction as the piston moves upwardly on the compression stroke.

While the high turbulence of the confined gases and the presence of the turbine vanes are believed to be of benefit in yet other ways not altogether understood, I have three principal purposes in setting the confined gases into agitation and keeping them agitated; first, to complete the thorough admixing and homogenizing of all parts of the charge material including fuel and gaseous components, second, to obtain a thorough admixing with the charge material of the unscavenged gases of the prior cycle, which are put into a state of rapid circulation and turbulence at the time of entry of the charge material for the next cycle and thoroughly admixed therewith, and third, to utilize the rapid state of movement of the confined gases at the moment of ignition to mechanically spread the ignition flame therethrough as rapidly as possible. When this internal agitation feature of my process is included, a somewhat later ignition timing than that set forth above is recommended to secure the optimum mean effective pressure and power. With its inclusion a substantial further increase in compression ratio is possible without detonation or preignition, provided distribution to the various engine cylinders is substantially uniform.

In the accompanying drawings, Fig. 1 is an elevation partly in section of an engine equipped for carrying out my process. Fig. 1ª is in part a sectional and in part a plan view of two of the engine cylinders. Fig. 2 is an end view partly in section of the metering rotor and related parts. Fig. 3 is a diagrammatical plan view of the metering rotor with ports shown in projected relation. Fig. 4 is an elevation partly in section similar to Fig. 1 but with modifications in the air inlet arrangements, and Fig. 5 is a sectional elevation with the valve omitted illustrating the flow of charge forming components.

Reference character 10 designates the intake conduit of an internal combustion engine, 12 the carburetor, 13 the passage for fuel for idling, 14 the throttle, 16 the exhaust conduit, 18 the intake valves, 20 the exhaust valves, 22 the cylinder bore, 24 the combustion chambers, and 26 the radiator fan.

The exhaust conduit 16 contains a Venturi-tube portion 28 surrounded by an air inlet 30 communicating with an air passage 30ª. This constitutes an aspirator for aeration of the entire exhaust gas stream and the extent of opening of air inlet passage 30ª is preferably controlled by the rotary metering valve 32 along with control of other passages for gaseous materials. The crank 32' of valve 32 is interlinked by link 33 with throttle 14 to turn in substantial consonance therewith.

The control of aerating air through passage 30ª need not be metered with especial closeness or accuracy, and it is ordinarily sufficient to provide the rotary valve 32, which may be solid, except for the port passages extending therethrough, with the substantially rectangular port 30ᵇ adapted upon rotation of valve 32 to be brought into more or less complete registration with a similarly formed port 30ᶜ in a stationary sleeve surrounding the rotary valve 32, as is common in constructing rotary valve mechanisms. The air supply to ports 30ᵇ and 30ᶜ, passage 30ª and aeration air inlet 30 is through the air supply conduit 34 (Fig. 1) or 34' (Fig. 4), the former terminating in a collection funnel 35 directly exposed to the blast from the fan 36, and the latter having its open mouth 37 directed toward the fan 36 and arranged in an air conduit 38 leading to the carburetor air inlet 40 and having a collecting funnel 42 exposed to the fan blast. The air conduit 34 or 34' also furnishes air to meter 32 for addition to the aerated exhaust gas, and which is referred to below.

The impact or Pitot tube 44 having its open mouth exposed against the flow of aerated exhaust gas in the exhaust gas conduit diverts a part of the aerated exhaust gas out through passage 44ª controlled by the metering valve port 44ᵇ coacting with a stationary port 44ᶜ. Port 44ᵇ is preferably narrowed down at the edge where the first registration and opening takes place, as indicated at 44ᵈ, so that upon the first part of the opening movement of the valve, a relatively close and accurate control is obtained of the quantity of aerated exhaust gas sent through the meter and out through the passage 44ᵉ.

The air added to the aerated exhaust gas is aspirated by the aerated exhaust gas, being introduced through the air inlet 46 surrounding the passage 44ᵉ. It is supplied through passage 46ᵃ and the flow is controlled by the meter port 46ᵇ registering on rotation of valve 32 with the stationary port 46ᶜ. Port 46ᵇ is preferably arranged to give accurate control of the air passing through upon partial opening of the metering valve, as, for example, its edge first coming into registration is inclined, as indicated at 46ᵈ.

The aerated exhaust gas delivered at 44ᵉ with the addition of aspirated air coming through inlet 46 is delivered through conduit 48 out through the nozzle 50 into the intake conduit 10 above the throttle 14, nozzle 50 being pointed in the direction of flow toward the engine cylinders.

Conduit 10 is preferably provided with the substantially rifled vanes 52 adapted to produce agitation and admixture of the charge constituents.

In the combustion chamber 24 over the cylinder bores 22, I preferably arrange one or more inclined vanes 54 to produce agitation within the cylinder on intake and compression stroke and to deliver heat to the incoming charges.

I also preferably cut off a part of the combustion chamber opposite vanes 54, as indicated at 56, so as to leave but a slight clearance over the piston head in this region and thus increase the agitational effect within the confined space of the power chamber upon the intake and compression strokes of the piston and also reduce the clearance space, thus increasing the compression ratio. This construction is described and claimed in my prior copending application Serial No. 164,350, filed January 28, 1927.

In the illustration, Fig. 5, reference character 60 indicates the stream of exhaust gas. The air stream for aerating the exhaust gas in the exhaust conduit is indicated by reference character 62, its inflow being controlled by the rotary metering valve 32. The principal part of the aerated exhaust gas stream 60—62 passes out, as indicated, through the exhaust gas outlet passage, but a part thereof is diverted and taken out through the impact tube and then through the rotary metering valve 32. The stream of additional air aspirated by the aerated exhaust gas is indicated by reference character 64 and its flow is likewise controlled by the metering valve. The stream delivered to the intake conduit by nozzle 50 is thus made up of exhaust gas component 60, the air of exhaust gas aeration 62 and the additional air 64, all mixed thoroughly together, but indicated separately in the diagram merely for purposes of identification.

The air stream 66 passing through the carburetor has fuel 68 mixed therewith upon passing the fuel jet, and this fuel and air stream together with the gases delivered through nozzle 50 make up a stream of charge material containing exhaust gas 60, air from the three sources 62, 64 and 66 and the fuel 68, as will be clearly seen from the flow sheet.

With an aspirator in the exhaust conduit, the suction tube 70 may be run from its region of greatest depression to the vacuum tank 72, thus supplementing the suction from the usual tube 74 run to the intake conduit over the throttle. A check valve 76 may be placed in the line 70, if desired.

It will be seen that the disclosed process is extremely simple and can be carried out with apparatus of like simplicity and extremely low cost. The control factors are always the same throughout the entire range of operation and no shifting from one device to another is required to take care of varying engine conditions, but merely change in degree or extent of use of the several means for controlling the quantity and proportions of air and exhaust gas made use of.

The showing of apparatus is intended only to afford an understanding of the process and is not to impose limitations upon my invention, the scope whereof is as defined by my claims.

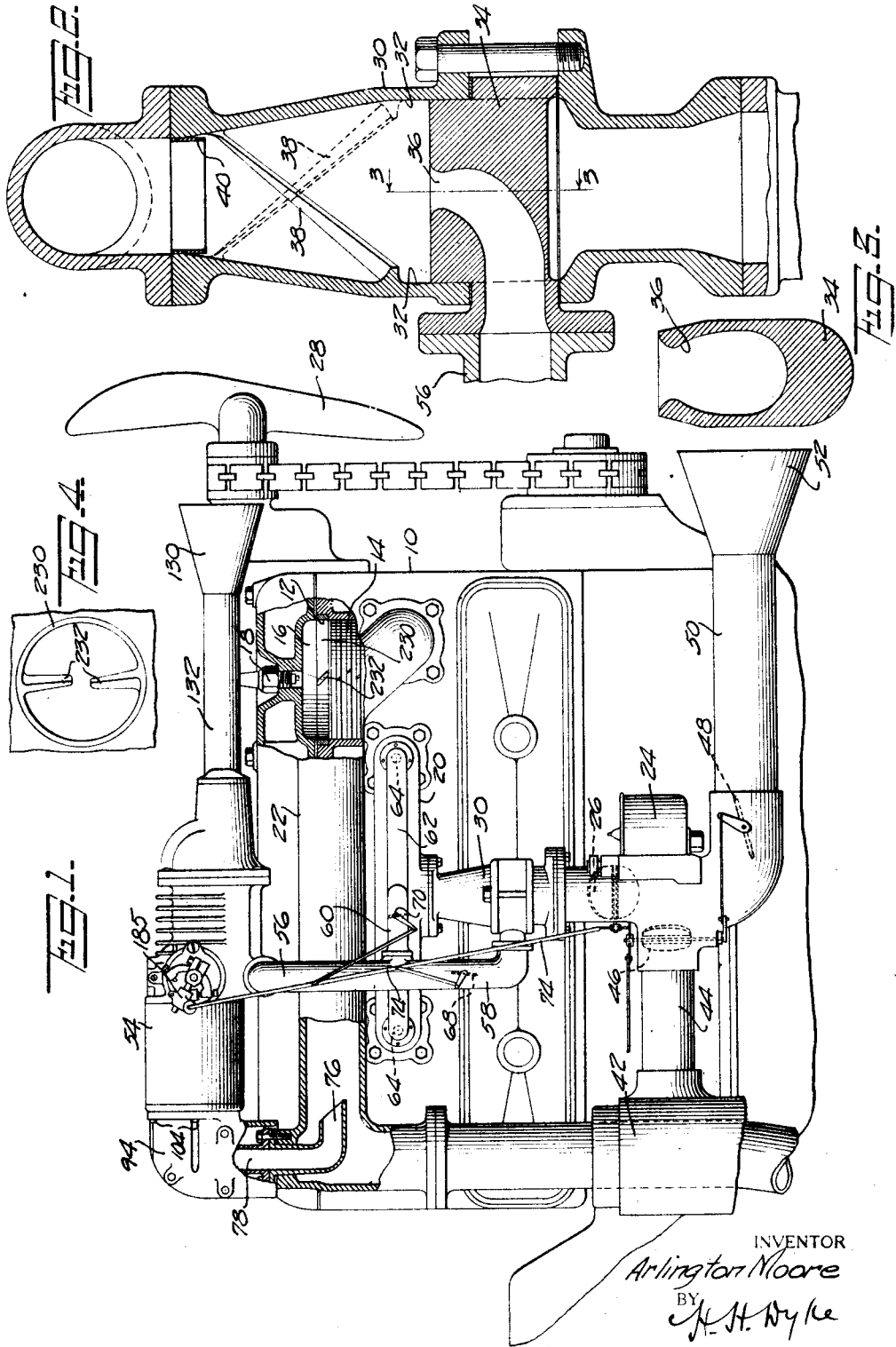

I claim:

1. In the process of forming charges for internal combustion engines, the steps which consist in admixing air with the exhaust gas stream, admixing additional air with a part of the mixture of air and exhaust gas, and delivering the resulting mixture to the engine cylinders with the fuel supply thereto.

2. In the process of forming charges for internal combustion engines consuming volatile liquid fuel, the steps of mixing fuel with an air stream, admixing air with the exhaust gas stream, mixing additional air with a part of the mixture of exhaust gas and air, mixing the resulting exhaust gas and air mixture with the fuel and air mixture, and delivering the resultant mixture to the engine cylinders.

3. In the process of forming charges for internal combustion engines consuming volatile liquid fuel, the steps of aspirating air with the exhaust gas stream, aspirating additional air with a part of the mixture of exhaust gas and air, and delivering the resultant mixture to the engine cylinders with the fuel supply thereto.

4. In the process of forming charges for internal combustion engines consuming volatile liquid fuel, the steps which consist of aspirating air into admixture with the exhaust gas stream, aspirating additional air into admixture with a part of the once aerated exhaust gas, mixing fuel with an air stream, throttling the fuel and air stream on its way to the engine cylinders, delivering the doubly aerated exhaust gas into admixture with the fuel and air stream after the latter has passed the point of throttling, and, adjunctively to throttling, metering the first and second supplies of air for aspiration and the portion of once aerated exhaust gas.

5. In the process of forming charges for internal combustion engines consuming volatile liquid fuel, the steps which consist of admixing air with the exhaust gas stream, admixing additional air with a part of the mixture of exhaust gas and air so obtained, admixing fuel with an air stream, throttling the fuel and air stream on its way to the engine cylinders, and delivering the mixture of exhaust gas and air into admixture with the fuel and air stream after it has passed the point of throttling while, adjunctively to throttling, metering the air supplied to the exhaust gas stream, the portion of the exhaust gas and air mixture taken and the air subsequently admixed with the portion taken.

6. In the process of forming charges for internal combustion engines consuming volatile liquid fuel, the steps which consists of aspirating air into admixture with the exhaust gas stream, diverting a part of the once aerated exhaust gas from the stream thereof with the stream driving force behind it, aspirating additional air with the portion of once aerated exhaust gas which has been diverted, mixing fuel with an air stream, throttling the fuel and air stream on its way to the engine cylinders, delivering the twice aerated portion of exhaust gas into admixture with the fuel and air stream after it has passed the point of throttling, and, adjunctively to throttling, metering: the first supply of air for aspiration, the second supply of air for aspiration, and the diverted portion of once aerated exhaust gas.

7. In the process of forming charges for an internal combustion engine consuming volatile liquid fuel, the steps which consist in mixing fuel with an air stream, throttling the fuel and air stream on its way to the engine cylinders, aspirating air into admixture with the exhaust gas stream, diverting a part of the resulting aerated exhaust gas from the stream thereof, delivering the diverted aerated exhaust gas into admixture with the fuel and air stream after it has passed the point of throttling, and, adjunctively to throttling, metering the air supply for aspiration and the diverted portion of aerated exhaust gas.

8. In the process of forming charges for internal combustion engines, the steps of admixing air with exhaust gas, admixing thereafter additional air with the mixture of air and exhaust gas first obtained, and delivering the resulting mixture to the engine cylinders with the fuel supply thereto.

9. In the process of forming charges for internal combustion engines, the steps of aspirating air with the exhaust gas stream, aspirating an additional portion of air with the once aerated exhaust gas, and delivering the resultant mixture to the engine cylinders with the main fuel and air supply thereto.

10. In the process of forming charges for internal combustion engines, the steps of aspirating air with the exhaust gas stream, aspirating an additional portion of air with the once aerated exhaust gas, metering adjunctively to throttling certain of said supplies of air for aspiration and the portion of once aerated exhaust gas, and delivering the resultant mixture to the engine cylinders with the main fuel and air supply thereto.

11. In the process of forming charges for internal combustion engines, the steps of admixing air with exhaust gas by the aspirating action of the main exhaust gas stream at a point thereof having substantially maximum kinetic energy, and diverting the relatively cooler, aerated exhaust gas from the stream of exhaust gas and delivering the same to the engine cylinders with the fuel supply thereto.

12. In the process of forming charges for internal combustion engines, the steps of admixing air with exhaust gas by the aspirating action of the main exhaust gas stream at a point thereof having substantially maximum kinetic energy, metering the relatively cooler and denser aerated exhaust gas, thereafter utilizing the kinetic energy of the metered aerated exhaust gas for aspirating additional air into admixture therewith, and delivering the resultant mixture into the main fuel and air stream.

13. In the process of forming charges for internal combustion engines, the steps of admixing air with exhaust gas by the aspirating action of the main exhaust gas stream at a point thereof having substantially maximum kinetic energy, controlling the quantity of air admitted into aspirating relation to the exhaust gas stream, diverting the aerated exhaust gas into the main fuel and air stream, and controlling the passage thereof.

In testimony whereof, I have signed my name hereto.

ARLINGTON MOORE.